May 17, 1932.  D. M. SILFIES  1,859,183
GRASS AND WEED CUTTER
Filed July 23, 1929

David Monroe Silfies
INVENTOR
BY Victor J. Evans
ATTORNEY

Patented May 17, 1932

1,859,183

UNITED STATES PATENT OFFICE

DAVID MONROE SILFIES, OF DUNDON, WEST VIRGINIA

GRASS AND WEED CUTTER

Application filed July 23, 1929. Serial No. 380,402.

My present invention has reference to a lawn mowing machine, and my primary object is the provision of a hand propelled mower for garden use that includes a finger bar and knives arranged for rotation over the fingers of the bar, whereby the blades of grass or weeds will be effectively cut and not mashed down as is common with ordinary mowers provided with the cylindrical blades.

A further object is the provision of a lawn mower which may be operated either by the ground wheels of the device or by a crank which is operated from the handle of the machine.

To the attainment of the foregoing and other objects which will present themselves as the nature of the invention is better understood, the improvement further consists in certain other novel features of construction, combination and operative association of parts, one satisfactory embodiment of which is disclosed by the accompanying drawings.

Figure 4:
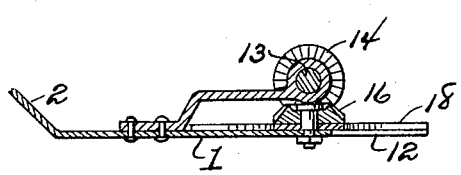
Figure 4 is a sectional view on the line 4—4 of Figure 2.
Figure 2:
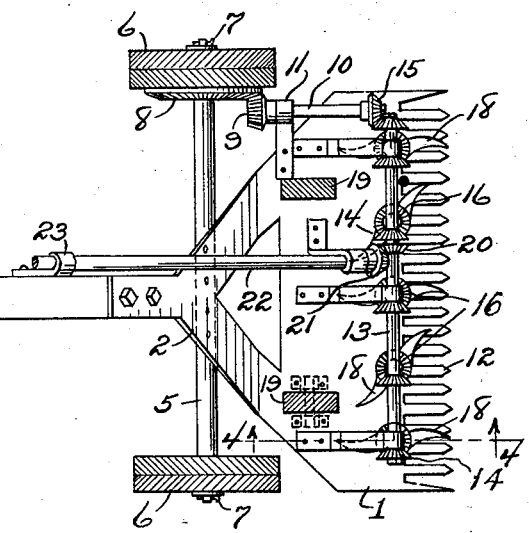
Figure 2 is a top plan view thereof.
Figure 3:
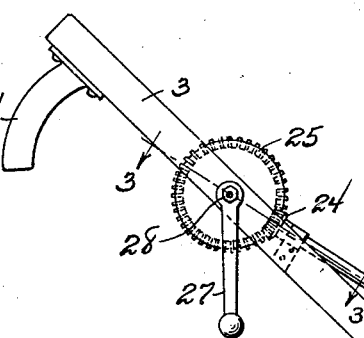
Figure 3 is a detail sectional view on the line 3—3 of Figure 1.
Figure 3:
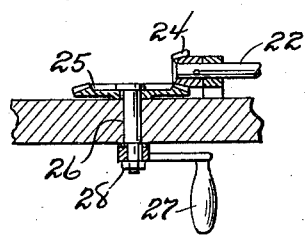
Figure 1:
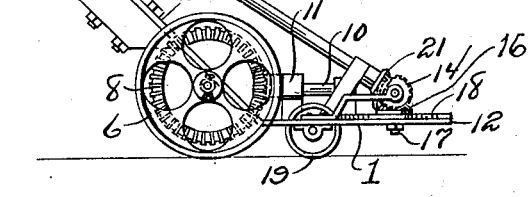
Figure 1 is a side elevation of a lawn mowing machine in accordance with this invention.

In carrying out my invention I make use of a flat plate 1 that has its rear end gradually reduced and arranged at an angle, as indicated by the numeral 2. To this end I bolt or otherwise secure the central handle bar 3 of the improvement. The bar 3 has on its under face, adjacent to its outer end a downwardly curved hand grip 4. The angle portion 2 of the plate 1 has fixed thereon an axle 5 on whose ends are journaled ground wheels 6. The ground wheels have their peripheries knurled or ribbed at opposite angles from the center to increase the traction grip thereof. The ground wheels are removably held on the axle 5 preferably by cotter pins 7. One of the ground wheels 6 has fixed on its inner face a gear wheel 8, and this wheel is in mesh with a beveled pinion 9 that is fixed on a shaft 10 journaled in a bearing 11 that is secured on the upper face of the plate 1. The outer end of the plate 1 is notched to provide the same with equidistantly spaced fingers 12 and directly to the rear of these fingers there is journaled in suitable bearings on the said plate 1 a shaft 13. This shaft has fixed thereon any desired number of beveled pinions 14, one of which is in mesh with a beveled gear 15 that is secured on the outer end of the shaft 10. All of the gears 14, except the gear in mesh with the beveled gear or pinion 15, mesh with similar gears 16 provided with stub shafts 17 that are journaled through bearing openings and removably fixed on the plate 1. Each of these gears 15 has fixed on its under face a centrally arranged knife member 18. The knife members each preferably comprise two oppositely curved blades and the said blades sweep over the plate 1 and the fingers 12 of the said plate. The plate 1, to the rear of the fingers is provided with a pair of spaced openings through each of which is journaled a short shaft of a roller 19, the said rollers having roughened or ribbed peripheries and the said rollers engaging with the ground surface. In addition to the beveled pinions 14 on the shaft 13, I fix another beveled pinion 20 that is in mesh with a similar pinion 21 on a shaft 22 that is journaled in bearings 23 supported on the plate 1 and on the handle bar 2. The upper or outer end of this shaft 22 has fixed thereon a beveled pinion 24 which is in mesh with a beveled gear 25. The bevel gear 25 has its shaft 26 journaled through a bearing opening in the handle bar 3 and the outer end of the shaft has secured thereto the socket end of a crank handle 27, removable means 28 holding the said crank handle on the shaft.

In operation the crank handle may be removed when the mower is wheeled over the main portion of a lawn and it will be apparent that the turning of the ground wheel 6 will impart a like turning to the shafts 10 and 13 and consequently a turning to the shafts 17 that carry the blades 18. The blades 18 wipe over the fingers 12 of the plate 1 and will effectively cut the blades of grass or weeds that are received between the said fingers. In close places the ground wheels 6 are removed from the shaft 5 and the crank handle 27 is attached to the short shaft 26. The device now rests entirely upon the rollers 19, and the operator turns the crank shaft which will impart a like turning to the shafts 13 and 17, causing the blades 18 to revolve over the fingers of the plate 1 so that grass and weeds in close places may be readily cut.

It is believed the construction and advantages of the improvement will be apparent to those skilled in the art to which such invention relates when the foregoing description has been carefully read in connection with the accompanying drawings but obviously I do not wish to be restricted to the precise details herein set forth and, therefore, hold myself entitled to make such changes from the illustrated embodiment as fairly fall within the scope of what I claim.

With my device it will be apparent that grass in lawns growing close to fences, alongside of walks, in corners, etc., which now require necessity of grass shears, sickles, and which makes it necessary for the operator to assume a stooping position or to bend upon his knees, that such grass or weeds can be cut by the operator standing in an upright position and thereby obviate the laborious work which is necessitated by the usual lawn mower constructions.

Having described the invention, I claim:

In a mower, a plate having a reduced inner end to which is fixed a handle and having its outer end formed with spaced fingers, an axle fixed on the plate and ground wheels journaled on the axle, ground contacting rollers journaled on the plate forward of the ground engaging wheels, stub shafts arising from the plate adjacent to the finger end thereof, knives, each having its outer face centrally formed with a gear, journaled on the respective stub shafts, a transverse shaft journalled on the plate, pinions fixed on the shaft and arranged to mesh with the gears on the knives and a pinion which is approximately centrally fixed on the transverse shaft, a handle operated shaft journaled in bearings on the handle and on the plate and having a gear to mesh with the said approximately centrally fixed pinion on the transverse shaft, said transverse shaft also having a pinion fixed on one end thereof, a short longitudinal shaft journaled on the plate and having a gear to mesh with said end pinion and another pinion on its second end, and a gear wheel fixed on the face of one of the ground contacting wheels meshing with the last-named pinion.

In testimony whereof I affix my signature.

DAVID MONROE SILFIES.